(12) United States Patent
Ha et al.

(10) Patent No.: US 10,657,706 B2
(45) Date of Patent: May 19, 2020

(54) 3D RENDERING METHOD AND APPARATUS

(71) Applicant: Samsung Electronics Co., Ltd., Suwon-si (KR)

(72) Inventors: Inwoo Ha, Seongnam-si (KR); Minsu Ahn, Yongin-si (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 15/364,502

(22) Filed: Nov. 30, 2016

(65) Prior Publication Data
US 2017/0193690 A1  Jul. 6, 2017

(30) Foreign Application Priority Data
Jan. 4, 2016 (KR) .................. 10-2016-0000253

(51) Int. Cl.
*G06T 15/80* (2011.01)
*G06T 15/50* (2011.01)
*G06T 15/20* (2011.01)

(52) U.S. Cl.
CPC .............. *G06T 15/80* (2013.01); *G06T 15/20* (2013.01); *G06T 15/506* (2013.01)

(58) Field of Classification Search
USPC ........................................................ 345/426
See application file for complete search history.

(56) References Cited

U.S. PATENT DOCUMENTS

| | | | | |
|---|---|---|---|---|
| 7,034,825 B2 * | 4/2006 | Stowe | ................... | G06T 15/00 345/419 |
| 8,289,318 B1 * | 10/2012 | Hadap | ................... | G06T 7/40 345/419 |
| 8,294,713 B1 * | 10/2012 | Amanieux | ................... | G06T 15/50 345/419 |
| 2004/0001062 A1 * | 1/2004 | Pharr | ................... | G06T 15/55 345/426 |
| 2007/0139408 A1 * | 6/2007 | Keranen | ................... | G06T 15/50 345/426 |
| 2008/0143720 A1 * | 6/2008 | Elmquist | ................... | G06T 15/50 345/426 |
| 2010/0128037 A1 * | 5/2010 | Hoffman | ................... | G06T 15/506 345/426 |
| 2010/0128038 A1 * | 5/2010 | Hoffman | ................... | G06T 15/506 345/426 |
| 2013/0328873 A1 | 12/2013 | Harada et al. | | |
| 2014/0267271 A1 | 9/2014 | Billeter et al. | | |

(Continued)

FOREIGN PATENT DOCUMENTS

| | | |
|---|---|---|
| JP | 2013-117966 A | 6/2013 |
| KR | 10-2013-0003376 A | 1/2013 |
| KR | 10-2015-0009906 A | 1/2015 |

*Primary Examiner* — Frank S Chen
(74) *Attorney, Agent, or Firm* — NSIP Law (57) ABSTRACT

A three-dimensional (3D) rendering method and apparatus to render a 3D scene is disclosed. The 3D rendering apparatus determines color values of vertices shaded by a direct virtual light source, establishes one or more locations of one or more indirect virtual light sources in polygonal areas formed by the vertices based on the determined color values of the vertices, and renders a 3D scene based on the one or more indirect virtual light sources disposed at the determined one or more locations.

19 Claims, 9 Drawing Sheets

(56) References Cited

U.S. PATENT DOCUMENTS

2015/0215512 A1    7/2015   Gautron et al.
2017/0124760 A1*   5/2017   Murakawa .............. G06T 17/20
2017/0178394 A1*   6/2017   Svakhin .................. G06T 15/30

* cited by examiner

3D RENDERING METHOD AND APPARATUS

CROSS-REFERENCE TO RELATED APPLICATION(S)

This application claims the benefit under 35 USC § 119(a) of Korean Patent Application No. 10-2016-0000253 filed on Jan. 4, 2016, in the Korean Intellectual Property Office, the entire disclosure of which is incorporated herein by reference for all purposes.

BACKGROUND

1. Field

The following description relates to three-dimensional (3D) computer graphics technology.

2. Description of Related Art

Three-dimensional (3D) rendering is used in various application such as, for example, 3D games, virtual reality, animations, videos, and movies. 3D rendering may be performed in various fashion, such as, for example, ray tracing that renders a 3D model by tracing a path through which light radiated from a light source is reflected from a surface of an object, radiosity rendering that applies not only a direct illumination effect but also an indirect illumination effect of light reflected from direct light by an object and of diffused reflection, and rasterization rendering that renders a 3D model by converting vector data to a pixel pattern image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a three-dimensional (3D) rendering method including determining color values of vertices shaded by a direct virtual light source, establishing one or more locations of one or more indirect virtual light sources in polygonal areas formed by the vertices based on the determined color values of the vertices, and rendering a 3D scene based on the one or more indirect virtual light sources disposed at the determined one or more locations.

The establishing of the one or more locations may include determining brightness values of the vertices based on the color values of the vertices, and establishing the one or more locations of the one or more indirect virtual light sources based on the brightness values of the vertices.

The establishing of the one or more locations may include determining a number of the one or more indirect virtual light sources for a current polygonal area based on a size of the current polygonal area from a viewpoint of a virtual camera and brightness values of vertices forming the current polygonal area.

The establishing of the one or more locations may include randomly designating the one or more locations to dispose the one or more indirect virtual light sources in the current polygonal area.

The establishing of the one or more locations may include determining a first location in the polygonal areas to place a first indirect virtual light source of the one or more indirect virtual light sources, and determining a second location in the polygonal areas to place a second indirect virtual light source of the one or more indirect virtual light sources based on color values of vertices determined through shading by the first indirect virtual light source.

The determining of the second location may include determining brightness values of the vertices based on the color values of the vertices determined through the shading by the first indirect virtual light source, and determining the second location in the polygonal areas for the second indirect virtual light source based on the brightness values of the vertices and a size of a polygonal area from a viewpoint of a virtual camera.

The establishing of the one or more locations may include determining locations in the polygonal areas for candidate indirect virtual light sources based on the color values of the vertices, and determining the one or more indirect virtual light sources from among the candidate indirect virtual light sources based on a location of a virtual camera.

The determining of the one or more indirect virtual light sources may include determining a sampling level for a hierarchy of the candidate indirect virtual light sources based on a distance between the location of the virtual camera and an area on which shading is to be performed, and determining the one or more indirect virtual light sources among the candidate indirect virtual light sources based on the determined sampling level.

The hierarchy of the candidate indirect virtual light sources may be based on a hierarchy of vertices of a 3D model.

The determining of the color values of the vertices may include determining the color values of the vertices based on a location and a color of the direct virtual light source, and locations, colors, and normals of the vertices.

The determining of the color values of the vertices may include determining the color values of the vertices based on vertex information in a vertex array.

The determining of the color values of the vertices may include determining the color values of the vertices by adding color values determined through shading by the direct virtual light source.

The determining of the color values of the vertices may include determining the color values of the vertices based on vertex information of the vertices and attribute information of the direct virtual light source.

The vertex information of each of the vertices may include at least one of location, a color, a normal, or a texture co-ordinate of the each of the vertices.

The attribute information of the direct virtual light source may include at least one of a location, a color, or a direction of the direct virtual light source.

In another general aspect, there is provided a three-dimensional (3D) rendering apparatus including at least one processor configured to determine color values of vertices shaded by a direct virtual light source, establish one or more locations of one or more indirect virtual light sources in polygonal areas formed by the vertices based on the determined color values of the vertices, and render a 3D scene based on the one or more indirect virtual light sources disposed at the determined one or more locations.

The processor may be configured to determine brightness values of the vertices based on the color values of the vertices, determine a number of the one or more indirect virtual light sources for a current polygonal area based on a size of the current polygonal area from a viewpoint of a virtual camera and brightness values of vertices forming the current polygonal area, and randomly designate the one or more locations to dispose the one or more indirect virtual light sources in the current polygonal area.

The processor may be configured to determine a location of a first indirect virtual light source in a first polygonal area, and determine a location of a second indirect virtual light source in a second polygonal area based on color values of vertices determined through shading by the first indirect virtual light source.

The processor may be configured to determine locations for candidate indirect virtual light sources in the polygonal areas based on the color values of the vertices, and determine the one or more indirect virtual light sources among the candidate indirect virtual light sources based on a location of a virtual camera.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only and is not to limit the examples. As used herein, the singular forms "a," "an," and "the" are intended to include the plural forms as well, unless the context clearly indicates otherwise.

In addition, terms such as first, second, A, B, (a), (b), and the like may be used herein to describe components. Each of these terminologies is not used to define an essence, order or sequence of a corresponding component but used merely to distinguish the corresponding component from other component(s).

Examples to be described hereinafter may be applicable to generate a rendered image by rendering a three-dimensional (3D) scene. The rendering of a 3D scene may include applying a visual effect such as an illumination effect and a shading effect to the 3D scene based on light emitted from a virtual light source. Through the application of the illumination effect, a color of a 3D model in the 3D scene may be determined. Also, through the application of the shading effect, a shadow formed by an occlusion may be determined. The illumination effect may be based on a characteristic of the light emitted from the virtual light source, for example, a color and a direction, and a characteristic of the 3D model, for example, a color and a material. The shading effect may be based on how the virtual light source and 3D models are arranged.

A type of the virtual light source may include, for example, a direct virtual light source and an indirect virtual light source (or a virtual point light VPL). The direct virtual light source is configured to directly emit light to a 3D model, and the indirect virtual light source is configured to emit light from an area in which light emitted from the direct virtual light source or another indirect virtual light source is reflected, diffracted, or refracted. For the indirect virtual light source, a sampling process may be needed to determine the number of indirect virtual light sources to be disposed in a 3D scene and a location at which each indirect virtual light source is to be disposed. According to the examples to be described hereinafter, the sampling process for an indirect virtual light source may be more effectively performed based on vertex information of vertices forming a 3D model, and thus a rendering speed may be improved.

Figure 1:
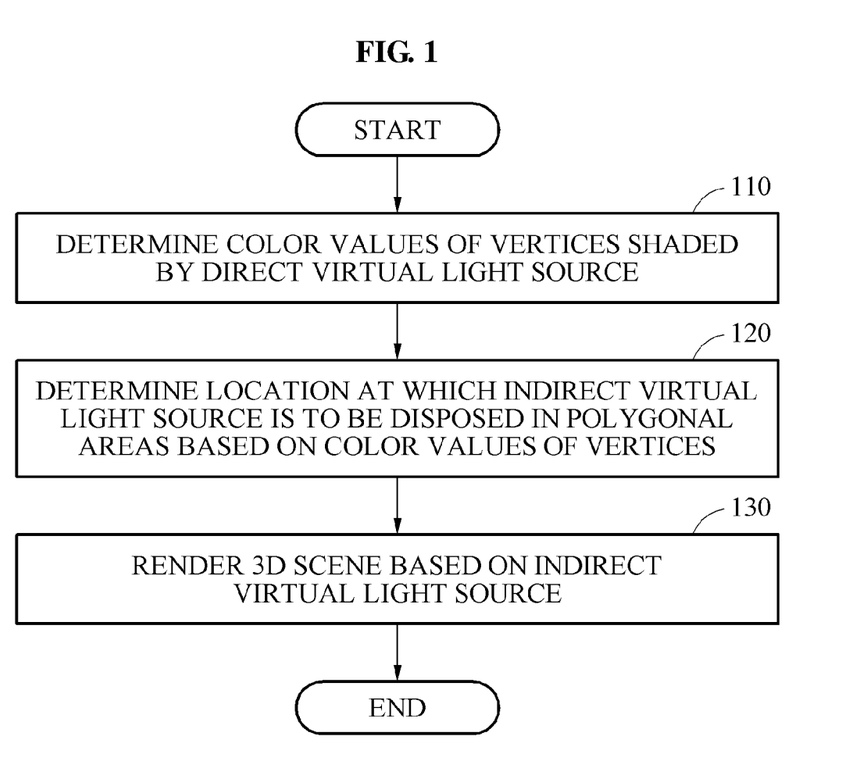
FIG. 1 is a diagram illustrating an example of a three-dimensional (3D) rendering method.

FIG. 1 is a diagram illustrating an example of a 3D rendering method. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently.

Referring to FIG. 1, in 110, a 3D rendering apparatus determines color values of vertices shaded by at least one direct virtual light source. The 3D rendering apparatus may determine a color value of each vertex by performing shading through each direct virtual light source. The 3D rendering apparatus may determine a color value of each vertex based on vertex information of vertices forming a 3D model and attribute information of the direct virtual light source. The vertex information may include information such as, for example, a location, a color, a normal, and a texture coordinate of a vertex. The attribute information of the direct virtual light source may include information such as, for example, a location, a color, and a direction of the direct virtual light source. In an example, the 3D rendering apparatus may use a vertex array, which is an arrangement defining the vertex information of vertices, to determine the color values of the vertices. The 3D rendering apparatus may extract vertex information of each vertex from the vertex array in sequential order, and determine a color value of each vertex based on the extracted vertex information.

The 3D rendering apparatus may determine a color value of each vertex based on a location and a color of the direct virtual light source, and on a location, a color, and a normal of each vertex as represented by Equation 1 below.

$$V_c=\{(Pos_l-Pos_v)\cdot Nor_v\}\times Col_l\times Col_v \quad [\text{Equation 1}]$$

In Equation 1, "$Pos_l$" and "$Pos_v$" denote a location of a direct virtual light source and a location of a vertex, respectively. "$Nor_v$" denotes a normal of the vertex. "$Col_l$" and "$Col_v$" denote a color of the direct virtual light source and a color of the vertex, respectively. "$V_c$" denotes a color value of the vertex determined through shading by the direct virtual light source. A calculation between ($Pos_l-Pos_v$) and $Nor_v$ is a vector dot product calculation.

The 3D rendering apparatus may determine the color values of the vertices shaded by each direct virtual light source based on Equation 1, and determine a final color value of the vertices by adding the color values determined through the shading by each direct virtual light source.

In 120, the 3D rendering apparatus performs sampling to determine a location at which an indirect virtual light source is to be disposed in polygonal areas formed by the vertices based on the color values of the vertices. For example, the location at which an indirect virtual light source is to be disposed may be determined based on the final color value obtained by adding the color values determined through the shading by each direct virtual light source in the presence of a plurality of direction virtual light sources. A polygonal area indicates a polygon forming a 3D model, for example, a triangle and a tetragon, and may be formed by a plurality of vertices. The 3D rendering apparatus may determine brightness values of the vertices based on the color values of the vertices, and determine the number of indirect virtual light sources to be disposed in a polygonal area based on brightness values of vertices forming the polygonal area and a size of the polygonal area from a viewpoint of a virtual camera. The 3D rendering apparatus may sample, in each polygonal area, the number of indirect virtual light sources determined for each polygonal area. A process of sampling an indirect virtual light source by the 3D rendering apparatus will be further described with reference to FIG. 2.

As described above, in one example, an amount of calculations or operations may be reduced and a rendering speed may be improved by sampling an indirect virtual light source based on the vertex information and the attribute information of the direct virtual light source. This is dome without rendering a 3D model at a viewpoint of each direct virtual light source to sample the indirect virtual light source and by sampling the indirect virtual light source from an image generated by projecting the 3D model to a screen space.

In another example, the 3D rendering apparatus may determine only some of indirect virtual light sources to be disposed in a polygonal area. For example, the 3D rendering apparatus may determine a greater number of indirect virtual light sources to be disposed in an area close to a screen among areas in a 3D scene, and a relatively less number of indirect virtual light sources to be disposed in an area remote from the screen, based on a location and a viewpoint direction of the virtual camera. Thus, the number of indirect virtual light sources to be processed in a rendering process may be reduced, and accordingly a rendering speed may be improved.

In an example, after sampling a first indirect virtual light source by the direct virtual light source, sampling a second indirect virtual light source by the first indirect virtual light source may be performed. The second indirect virtual light source is a virtual light source configured to emit light from an area in which light emitted from the first indirect virtual light source is reflected, diffracted, or refracted. The first indirect virtual light source may correspond to a first bounce, and the second indirect virtual light source may correspond to a second bounce. The 3D rendering apparatus may sample indirect virtual light sources up to a bounce of a preset order. A process of sampling a multi-bounce indirect virtual light source by the 3D rendering apparatus will be further described with reference to FIG. 3.

In 130, the 3D rendering apparatus renders a 3D scene based on the indirect virtual light source disposed at the location determined in 120. The 3D rendering apparatus may generate a realistic rendered image by applying, to the 3D scene, a visual effect by the direct virtual light source and a virtual effect by the indirect virtual light source.

Figure 2:
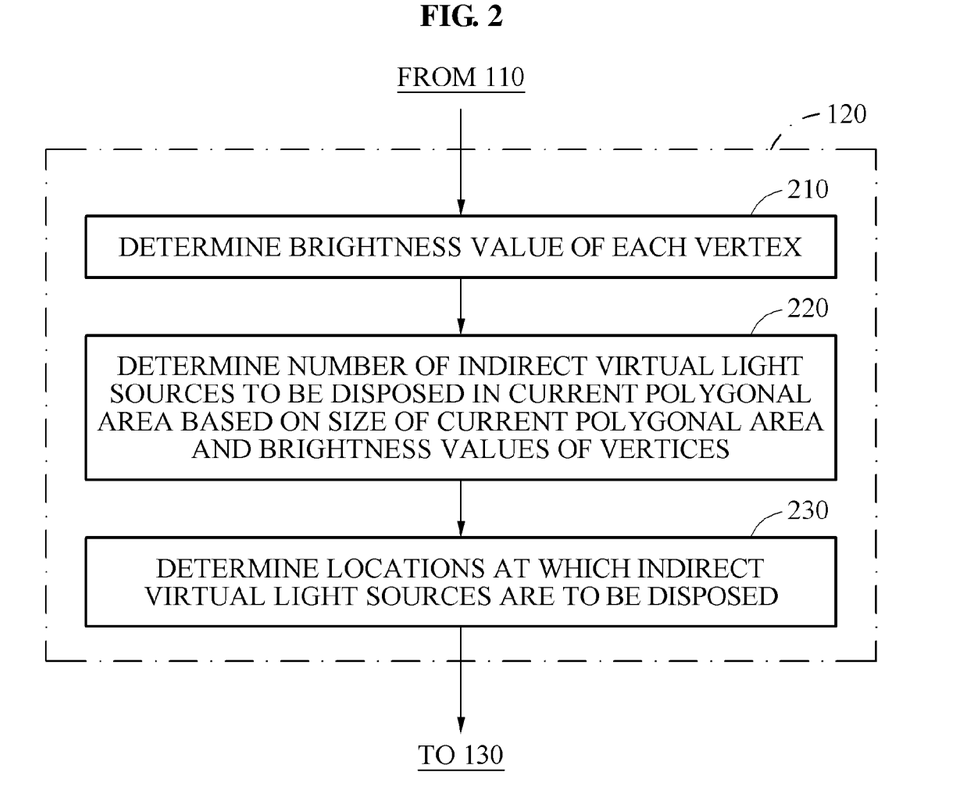
FIGS. 2 and 3 are diagrams illustrating examples of a process of sampling an indirect virtual light source.

FIG. 2 is a diagram illustrating an example of a process of sampling an indirect virtual light source. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. In addition to the description of FIG. 2 below, the above descriptions of FIG. 1, are also applicable to FIG. 2, and are incorporated herein by reference. Thus, the above description may not be repeated here.

Referring to FIG. 2, in 210, a 3D rendering apparatus determines a brightness value of each vertex. The 3D rendering apparatus may determine a brightness value of each vertex by calculating an average of red (R), green (G), blue (B) color values of each vertex, or adding RGB color values to which a weighted value is applied.

In 220, the 3D rendering apparatus determines the number of indirect virtual light sources to be disposed in a current polygonal area based on a size of the current polygonal area from a viewpoint of a virtual camera and on brightness values of vertices forming the current polygonal area. In an example, when the size of the current polygonal area viewed from the viewpoint of the virtual camera increases and the brightness values of the vertices forming the current polygonal area increase, the 3D rendering apparatus may determine a greater number of indirect virtual light sources to be disposed in the current polygonal area. For example, the 3D rendering apparatus may determine an average brightness value for the current polygonal area by calculating an average of the brightness values of the vertices forming the current polygonal area, and set a weighted value to be proportional to the average brightness value and the size of the current polygonal area from the viewpoint of the virtual camera. When the weighted value increases, the 3D rendering apparatus may determine a greater number of indirect virtual light sources to be disposed in the current polygonal area.

In 230, the 3D rendering apparatus determines locations of the determined number of indirect virtual light sources in the current polygonal area. In one example, the 3D rendering apparatus may randomly determine a location at which an indirect virtual light source is to be disposed in the current polygonal area. Thus, the indirect virtual light source may be disposed in a random location in the current polygonal area. In another example, the 3D rendering apparatus may determine a probability value at which an indirect virtual light source is to be sampled at each location in the current polygonal area based on a brightness value of each vertex forming the current polygonal area. The 3D rendering apparatus may determine a location at which the indirect virtual light source is to be disposed based on the determined probability value. For example, the indirect virtual light source may be highly likely to be disposed in an area in the current polygonal area that is adjacent to a vertex having a high brightness value, and the indirect virtual light source may be less likely to be disposed in an area in the current polygonal area that is adjacent to a vertex having a low brightness value.

The 3D rendering apparatus may determine a location at which an indirect virtual light source is to be disposed in all polygonal areas by performing operations 220 and 230 for the polygonal areas in a 3D model.

In another example, the 3D rendering apparatus may determine locations at which candidate indirect virtual light sources are to be disposed in polygonal areas by performing operations 210 through 230. The 3D rendering apparatus may select an indirect virtual light source on which shading is to be performed among the candidate indirect virtual light sources based on a location of the virtual camera. The shading may not be performed on an unselected candidate indirect virtual light source.

In an example, the 3D rendering apparatus uses a hierarchy or a hierarchical structure of the candidate indirect virtual light sources to determine the indirect virtual light source on which the shading is to be performed. The hierarchy of the candidate indirect virtual light sources may define candidate indirect virtual light sources on which shading is to be performed based on a sampling level. In an example, the hierarchy of the candidate indirect virtual light sources may be generated based on a hierarchy of vertices of a 3D model. The hierarchy of vertices may define a hierarchical relationship between vertices included in each vertex group defined based on a distance between the vertices and a location of each vertex. For each candidate indirect virtual light source, a vertex associated with a corresponding candidate indirect virtual light source may be determined, and the hierarchy of the candidate indirect virtual light sources based on the hierarchy of the vertices may be defined.

The hierarchy of the candidate indirect virtual light sources may define, based on the sampling level, which candidate indirect virtual light source is determined to be the indirect virtual light source on which the shading is to be performed. In an example, when the sampling level increases, the number of indirect virtual light sources to be determined from a group of candidate indirect virtual light sources may increase. In another example, when the sampling level decreases, the number of indirect virtual light sources to be determined from the group of the candidate indirect virtual light sources may decrease. A group of candidate indirect virtual light sources may be determined by grouping candidate indirect virtual light sources based on whether the candidate indirect virtual light sources are located adjacent to one another or whether colors of the candidate indirect virtual light sources are similar to one another. For example, candidate indirect virtual light sources to be disposed in a same 3D model may be determined to be one group of candidate indirect virtual light sources.

In one example, the sampling level may be determined based on a distance between the virtual camera and an area on which shading is to be performed. In an example, the 3D rendering apparatus may set the sampling level to be lower for a shading area remote from the virtual camera to determine only a portion of the candidate indirect virtual light sources to be the indirect virtual light source on which the shading is to be performed. In another example, the 3D rendering apparatus may set the sampling level to be higher for a shading area close to the virtual camera to determine a greater number of candidate indirect virtual light sources to be sampled.

In another example, the sampling level may be determined based on a change in brightness in an area over time. In an example, the 3D rendering apparatus may set the sampling level to be higher for an area having a high change in brightness over time to determine a greater number of candidate indirect virtual light sources to be sampled. In another example, the 3D rendering apparatus may set the sampling level to be lower for an area having a less change in brightness over time to determine a less number of candidate indirect virtual light sources to be sampled.

Figure 3:
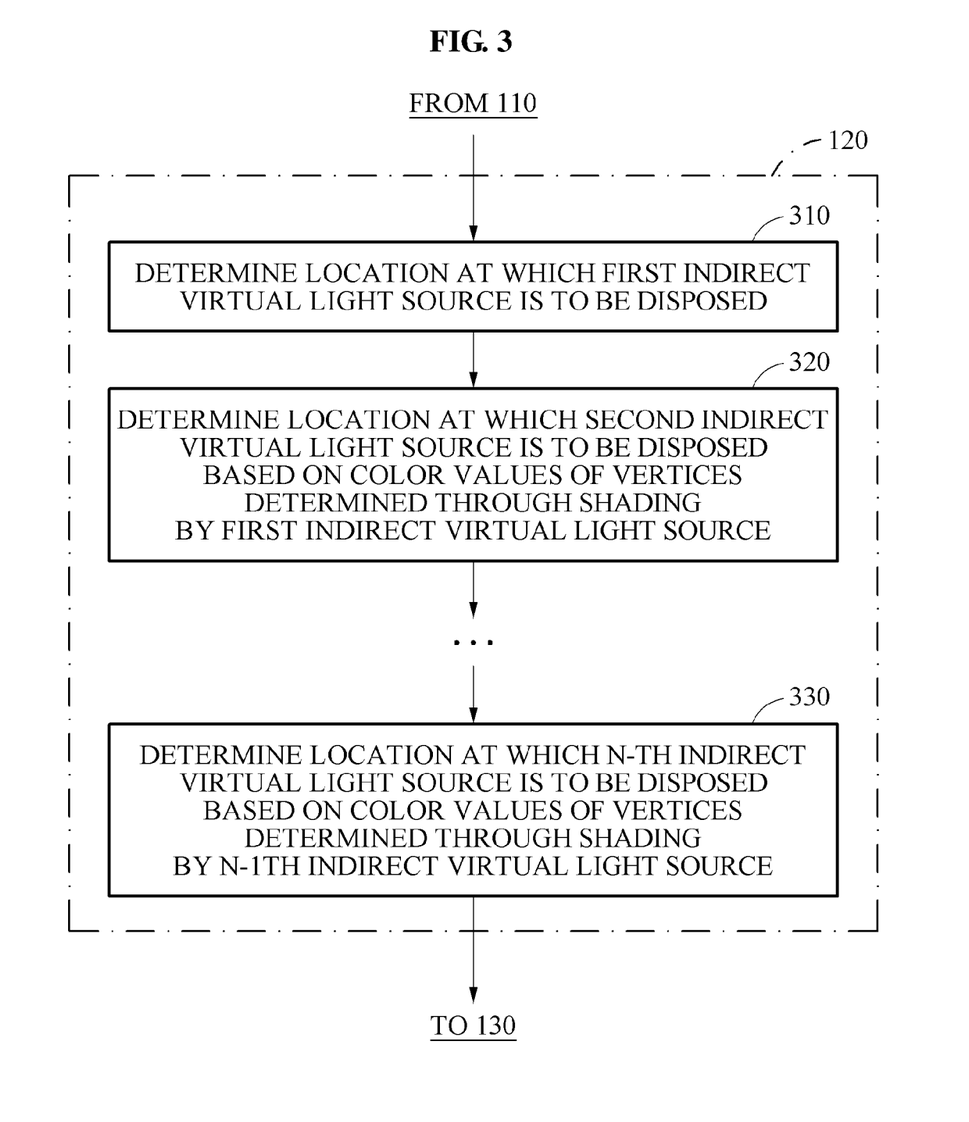

FIG. 3 is a diagram illustrating an example of a process of sampling a multi-bounce indirect virtual light source. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. In addition to the description of FIG. 3 below, the above descriptions of FIGS. 1-2, are also applicable to FIG. 3, and are incorporated herein by reference. Thus, the above description may not be repeated here.

Referring to FIG. 3, in 310, a 3D rendering apparatus determines a location at which a first indirect virtual light source by a direct virtual light source is to be disposed in a 3D scene. For a detailed description, reference may be made to the descriptions of a process of sampling an indirect virtual light source by a direct virtual light source provided with reference to FIGS. 1 and 2.

In 320, the 3D rendering apparatus determines a location at which a second indirect virtual light source is to be disposed in polygonal areas based on color values of vertices determined through shading by the first indirect virtual light source. The 3D rendering apparatus may determine a color value of each vertex to sample the second indirect virtual light source as represented by Equation 2 below.

$$V_{c1} = \{(Pos_{li1} - Pos_v) \cdot Nor_v\} \times Col_{li1} \times Col_v \quad \text{[Equation 2]}$$

In Equation 2, "$Pos_{li1}$" and "$Pos_v$" denote a location of a first indirect virtual light source and a location of a vertex, respectively. "$Nor_v$" denotes a normal of the vertex. "$Col_{li1}$" and "$Col_v$" denote a color of the first indirect virtual light source and a color of the vertex, respectively. "$V_{c1}$" denotes a color value of the vertex determined through shading by the first indirect virtual light source.

Similarly to operations 210 and 230 described with reference to FIG. 2, the 3D rendering apparatus may determine the number of second indirect virtual light sources to be disposed in each polygonal area based on brightness values of vertices shaded by the first indirect virtual light source and on a size of a polygonal area from a viewpoint of a virtual camera. Likewise, the 3D rendering apparatus may determine locations at which the determined number of second indirect virtual light sources are to be disposed in each polygonal area based on the determined number of second indirect virtual light sources. Through operation 320, the second indirect virtual light source of a secondary bounce may be sampled.

In 330, the 3D rendering apparatus determines a location of an N-th indirect virtual light source is to be disposed in the polygonal areas based on color values of vertices determined through shading by an N−1th indirect virtual light source. In an example, the 3D rendering apparatus may sample indirect virtual light sources up to a bounce of a preset order.

As described above, the 3D rendering apparatus may sample a multi-bounce indirect virtual light source based on information of a previously sampled indirect virtual light source, without performing rendering at a viewpoint of each indirect virtual light source. Thus, an amount of operations needed for the rendering and an overhead may be reduced, and thus the rendering may be performed more rapidly.

Figure 4:
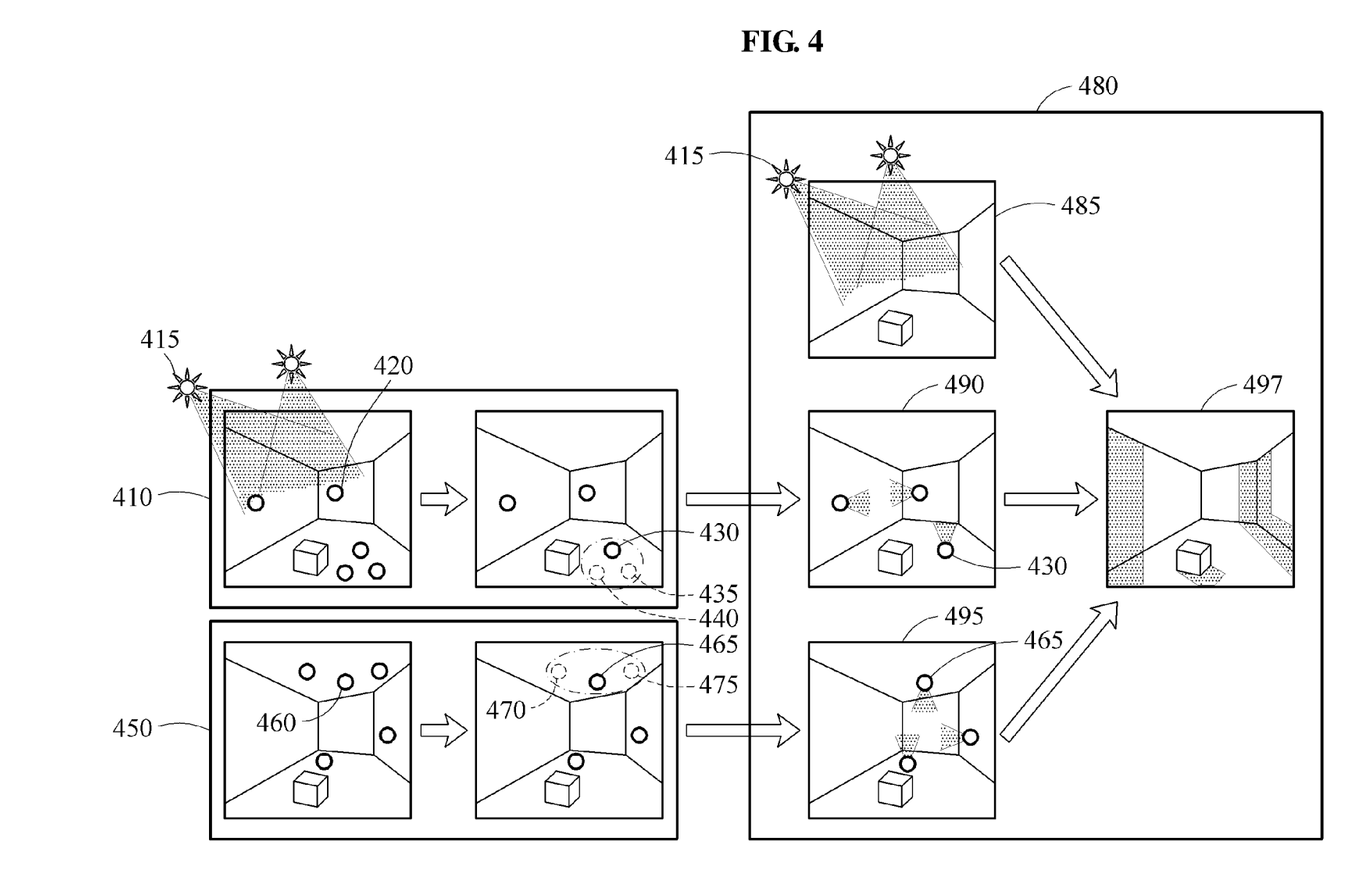
FIG. 4 is a diagram illustrating an example of performing a 3D rendering method.

FIG. 4 is a diagram illustrating an example of performing a 3D rendering method.

Referring to FIG. 4, in 410, a 3D rendering apparatus samples a first indirect virtual light source by a direct virtual light source. The 3D rendering apparatus determines a brightness value of each vertex of a 3D model shaded by each of direct virtual light sources 415, and samples first candidate indirect virtual light sources 420 in a 3D scene based on a determined brightness value of each vertex.

In one example, the 3D rendering apparatus may determine a group of the first candidate indirect virtual light sources 420 by grouping the first candidate indirect virtual light sources 420. For example, the 3D rendering apparatus may determine neighboring first candidate indirect virtual light sources, for example, a first candidate indirect virtual light source 430, a first candidate indirect virtual light source 435, and a first candidate indirect virtual light source 440, to comprise one group. When a distance between a virtual camera and the first candidate indirect virtual light sources 430, 435, and 440 is greater than a value, the 3D rendering apparatus may perform shading only on the first candidate indirect virtual light source 430 among the group comprising the first candidate indirect virtual light sources 430, 435, and 440. The 3D rendering apparatus may not perform the shading on the remaining first candidate indirect virtual light sources 435 and 440. As described above, the 3D rendering apparatus may reduce an amount of operations and improve rendering speed by reducing the number of indirect virtual light sources on which shading is to be performed for an area in a 3D scene that is located remotely from the virtual camera.

In 450, the 3D rendering apparatus samples a second indirect virtual light source by the first indirect virtual light source. The 3D rendering apparatus determines a brightness value of each vertex shaded by each of first indirect virtual light sources, and samples second candidate indirect virtual light sources 460 in the 3D scene based on a determined brightness value of each vertex. In one example, the 3D rendering apparatus may determine a group of the second candidate indirect virtual light sources 460 by grouping the second candidate indirect virtual light sources 460. For example, the 3D rendering apparatus may determine neighboring second candidate indirect virtual light sources, for example, a second candidate indirect virtual light source 465, a second candidate indirect virtual light source 470, and a second candidate indirect virtual light source 475, to comprise one group. When a distance between the virtual camera and the second candidate indirect virtual light sources 465, 470, and 475 is greater than a value, the 3D rendering apparatus may perform shading only on the second candidate indirect virtual light source 465, and may not perform the shading on the remaining second candidate indirect virtual light sources 470 and 475.

In 480, the 3D rendering apparatus generates a rendered image 497 by combining a image 485, a image 490, and a image 495. The image 485 is a result obtained by performing shading by each of the direct virtual light sources 415. The image 490 is a result obtained by performing shading by the first candidate indirect virtual light source 430. The image is a result obtained by performing shading by the second candidate indirect virtual light source 465.

Figure 5:
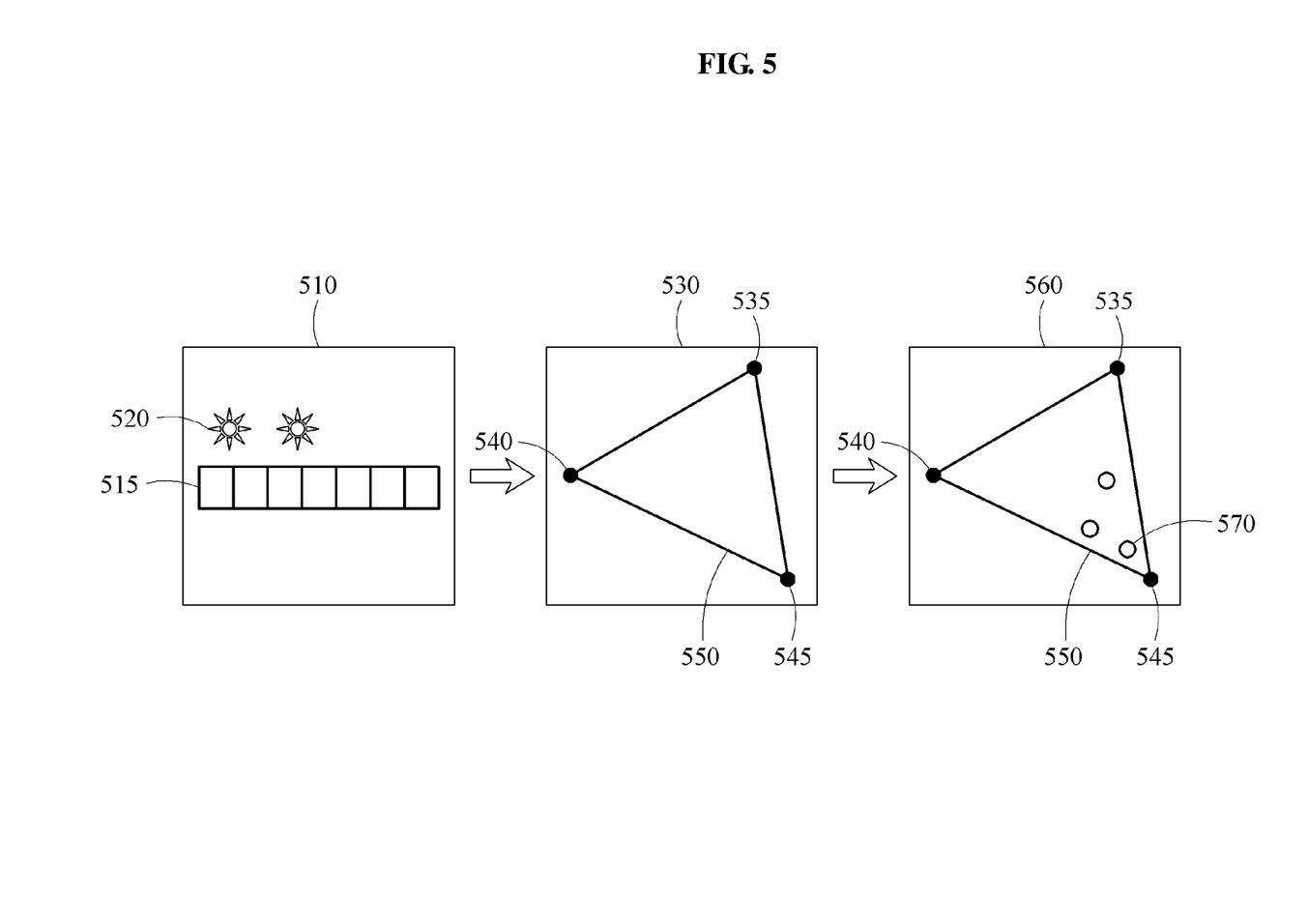
FIG. 5 is a diagram illustrating an example of sampling an indirect virtual light source based on a vertex array.

FIG. 5 is a diagram illustrating an example of sampling an indirect virtual light source based on a vertex array.

Referring to FIG. 5, in 510, a 3D rendering apparatus determines a color value of each vertex by performing shading by each of direct virtual light sources 520. In an example, the 3D rendering apparatus uses a vertex array 515, which is an arrangement defining vertex information of each vertex. The 3D rendering apparatus may extract vertex information of each vertex from the vertex array 515, and determine a color value of a vertex shaded by each of the direct virtual light sources 520 based on the extracted vertex information. For sampling an indirect virtual light source of a multi-bounce of a second order or higher, in 510, the 3D rendering apparatus may determine a color value of each vertex by performing shading on a previously sampled indirect virtual light source.

In 530, the 3D rendering apparatus determines a brightness value of each vertex, for example, a vertex 535, a vertex 540, and a vertex 545, based on a color value of each of the vertices 535, 540, and 545. For example, the 3D rendering apparatus may determine a simple average of R, G, B color values of the vertex 535 to be a brightness value of the vertex 535. In another example, the 3D rendering apparatus may determine a sum of the R, G, B color values to be a brightness value of the vertex 535. In another example, the 3D rendering apparatus may determine a sum of the R, G, B color values to which a weighted value is applied to be a brightness value of the vertex 535. The 3D rendering apparatus may determine the brightness values of the remaining vertices 540 and 545 by performing the process described above for the vertex 535. The 3D rendering apparatus may determine an average brightness value of a polygonal area 550 formed by the vertices 535, 540, and 545 based on the brightness values of the vertices 535, 540, and 545. For example, the 3D rendering apparatus may determine the average brightness value of the polygonal area 550 by simply calculating an average of the brightness values of the vertices 535, 540, and 545.

In 560, the 3D rendering apparatus determines the number of indirect virtual light sources to be sampled in the polygonal area 550 based on the average brightness value of the polygonal area 550 and a size of the polygonal area 550 viewed from a viewpoint of a virtual camera (or projected to a screen from the viewpoint of the virtual camera). The 3D rendering apparatus samples the determined number of indirect virtual light sources 570 in the polygonal area 550. In an example, when the average brightness value of the polygonal area 550 increases, and the size of the polygonal area 550 increases, the 3D rendering apparatus may determine a greater number of indirect virtual light sources are to be sampled in the polygonal area 550. The 3D rendering apparatus may then arrange the indirect virtual light sources 570 at locations in the polygonal area 550. In an example, the location of the indirect virtual light sources 570 is randomly determined.

Figure 6A:
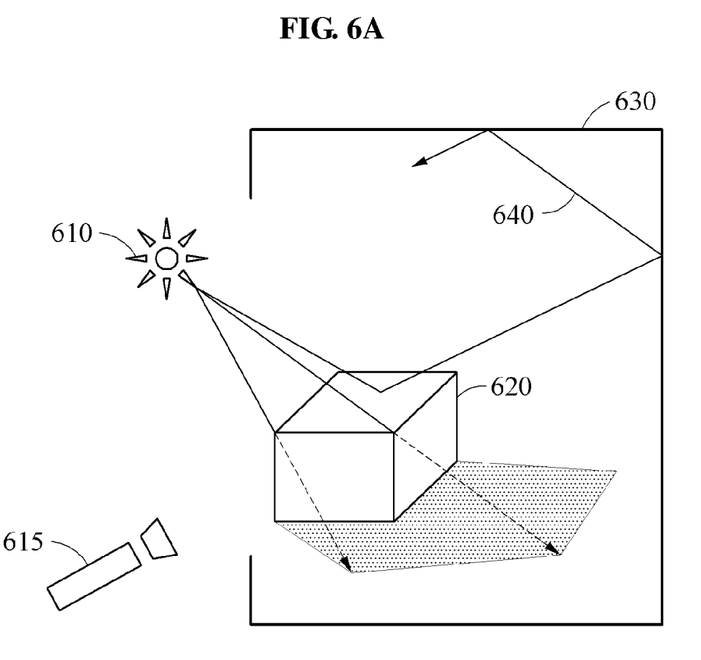
FIGS. 6A through 6C are diagrams illustrating examples of a relationship between a direct virtual light source and an indirect virtual light source.
Figure 6B:
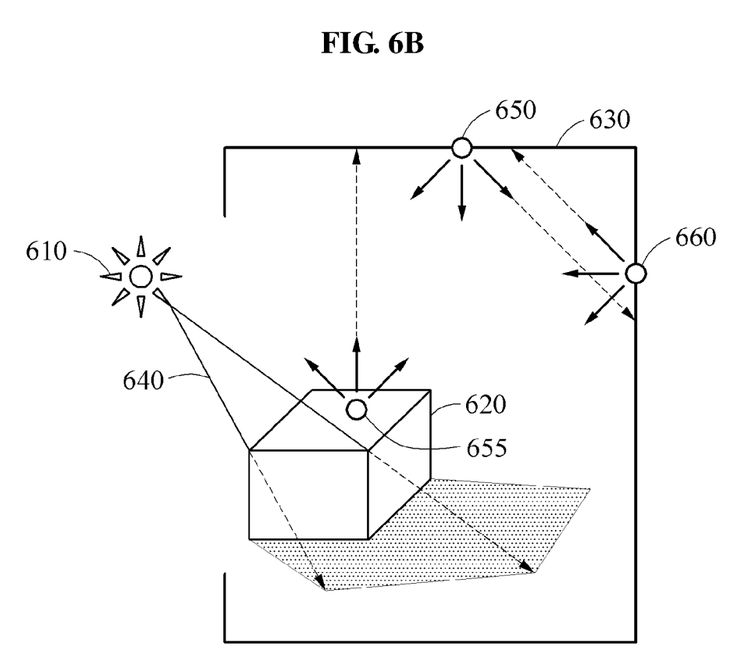
Figure 6C:
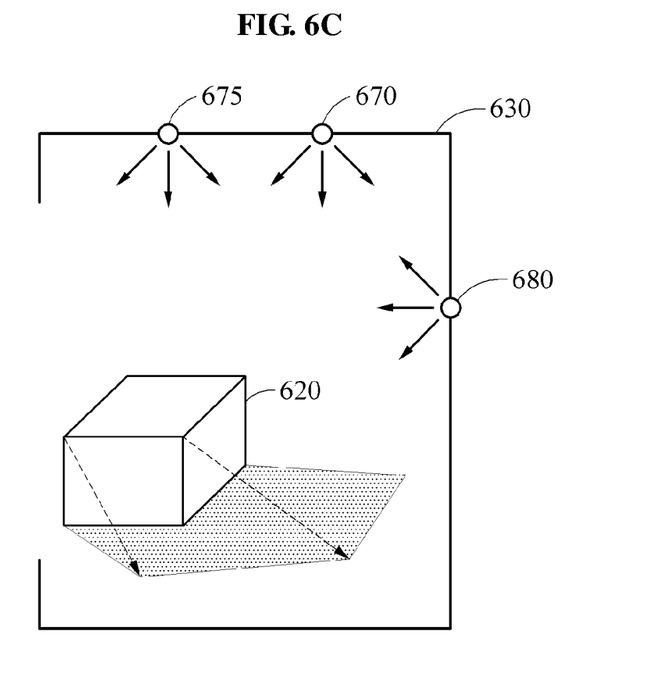

FIGS. 6A through 6C are diagrams illustrating examples of a relationship between a direct virtual light source and an indirect virtual light source.

A direct virtual light source and an indirect virtual light source refer to virtual light sources that apply a visual effect to a 3D model in a computer graphics. The direct virtual light source is a virtual light source that directly emits light to the 3D model. The indirect virtual light source is a virtual light source that emits light from an area in which the light emitted from the direct virtual light source or another indirect virtual light source is reflected, diffracted, or refracted.

FIG. 6A is a diagram illustrating a 3D model, for example, a 3D model 620 and a 3D model 630, and a direct virtual light source 610. Although a single direct virtual light source is illustrated in FIG. 6A for simplicity of description, a plurality of direct virtual light sources may exist. Referring to FIG. 6A, the direct virtual light source 610 directly emits light to the 3D model 620. Based on a location relationship between the direct virtual light source 610 and the 3D model 620, a bright area and a dark area may be first determined in a virtual space in which the 3D model 620 is to be rendered. The light emitted from the direct virtual light source 610 may be reflected, diffracted, or refracted by the 3D model 620. For example, as illustrated in FIG. 6A, light 640 output from the direct virtual light source 610 may be reflected by the 3D model 620 and then reflected again by another 3D model, the 3D model 630. In an example, the 3D model 630 may be a wall surrounding an area adjacent to the 3D model 620. The 3D models 620 and 630 may be rendered from a viewpoint of a virtual camera 615, and a rendered image may be provided to a user.

A 3D rendering apparatus may generate a detailed rendered image by applying a visual effect by the light output from the direct virtual light source 610 and also a visual effect by light output from an indirect virtual light source. The 3D rendering apparatus may embody a more realistic visual effect by appropriately arranging indirect virtual light sources in a 3D space in addition to the direct virtual light source 610.

FIG. 6B is a diagram illustrating an indirect virtual light source 655 located in an area in which the light 640 output from the direct virtual light source 610 is reflected by the 3D model 620. Indirect virtual light sources 650 and 660 are located in areas in which the light 640 is reflected by the 3D model 630. When rendering the 3D models 620 and 630, a visual effect by the indirect virtual light sources 650, 655, and 660, in addition to a visual effect by the direct virtual light source 610, may be applied to the 3D models 620 and 630. The indirect virtual light sources 650, 655, and 660 may be affected by the direct virtual light source 610 and also by a characteristic of the areas in which the indirect virtual light sources 650, 655, and 660 are located. For example, the visual effect of the indirect virtual light sources 650, 655, and 660 may be affected by a color or a material of a surface of the 3D models 620 and 630 on which the indirect virtual light sources 650, 655, and 660 are located. Light emitted from the indirect virtual light sources 650, 655, and 660 may be reflected, diffracted, or refracted by the 3D models 620 and 630. Locations at which secondary indirect virtual light sources or secondary bounces are to be disposed may be determined based on the light reflected, diffracted, or refracted by the 3D models 620 and 630. Examples of such secondary indirect virtual light sources are illustrated in FIG. 6C. Referring to FIG. 6C, locations of indirect virtual light sources 670, 675, and 680 may be determined based on locations in the 3D models 620 and 630 at which the light emitted from the indirect virtual light sources 650, 655, and 660 arrives.

Figure 7:
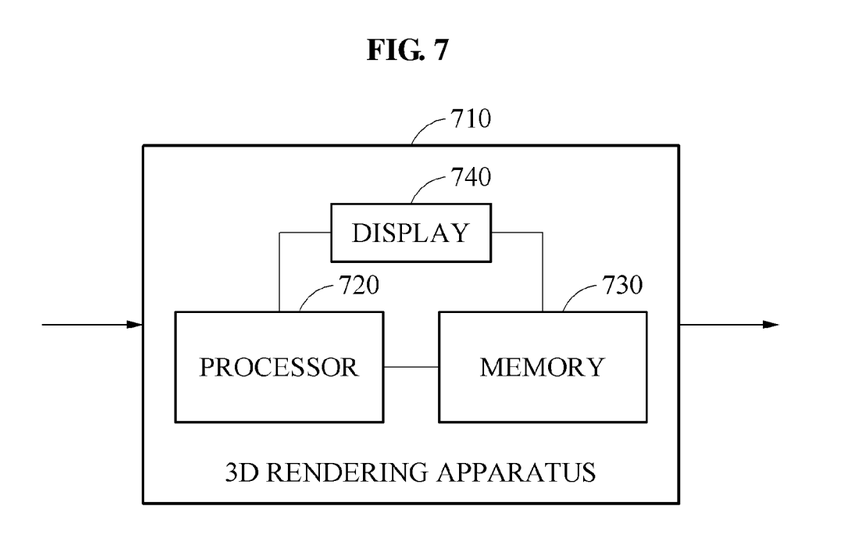
FIG. 7 is a diagram illustrating an example of a 3D rendering apparatus.

FIG. 7 is a diagram illustrating an example of a 3D rendering apparatus 710. Referring to FIG. 7, the 3D rendering apparatus 710 includes at least one processor 720, at least one memory 730, and at least one display 740.

The processor 720 performs at least one operation or process described with reference to FIGS. 1 through 6C. For example, the processor 720 may apply a visual effect, for example, an illumination effect and a shading effect, by a direct virtual light source and an indirect virtual light source to a 3D scene in order to render the 3D scene. In an example, the processor 720 may determine a color value of each vertex shaded by at least one direct virtual light source, and determine a location at which an indirect virtual light source is to be disposed in polygonal areas based on a determined color value of each vertex. In an example, the processor 720 is configured as an array of a plurality of logic gates, and also as an hardware. In addition, the processor 720 may include at least one graphics processing unit (GPU) to render the 3D scene.

The memory 730 may store instructions to perform at least one operation or process described with reference to FIGS. 1 through 6C, and also store data or results obtained during an operation of the 3D rendering apparatus 710. In an example, the memory 730 may include a non-transitory computer-readable medium, for example, a high-speed random access memory (RAM) and/or a nonvolatile computer-readable storage medium (for example, at least one disk storage device, flash memory device, or other nonvolatile solid-state memory devices).

In an example, the processor 720 generates a realistic rendered image by applying, to a 3D scene, a visual effect produced by a direct virtual light source and a virtual effect by one or more indirect virtual light source. The processor 720 displays the rendered image on a display 740. In an example, the processor 720 may produce a more realistic visual effect by appropriately arranging indirect virtual light sources in a 3D space in addition to the direct virtual light source, and the processor 720 may displays the realistic visual effect on the display 740. The display 740 may be a physical structure that includes one or more hardware components that provide the ability to render a user interface and/or receive user input. The display 740 can encompass any combination of display region, gesture capture region, a touch sensitive display, and/or a configurable area. The display 740 can be embedded in the 3D rendering apparatus 710 or may be an external peripheral device that may be attached and detached from the 3D rendering apparatus 710. The display 740 may be a single-screen or a multi-screen display. A single physical screen can include multiple displays that are managed as separate logical displays permitting different content to be displayed on separate displays although part of the same physical screen. The display 740 may also be implemented as an eye glass display (EGD), which includes one-eyed glass or two-eyed glasses.

As a non-exhaustive illustration only, the 3D rendering apparatus 710 may be embedded or interoperate with various digital devices such as, for example, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein. The digital devices may be implemented in a smart appliance, an intelligent vehicle, or in a smart home system.

The digital devices may also be implemented as a wearable device, which is worn on a body of a user. In one example, a wearable device may be self-mountable on the body of the user, such as, for example, a watch, a bracelet, or as an eye glass display (EGD), which includes one-eyed glass or two-eyed glasses. In another non-exhaustive example, the wearable device may be mounted on the body of the user through an attaching device, such as, for example, attaching a smart phone or a tablet to the arm of a user using an armband, incorporating the wearable device in a cloth of the user, or hanging the wearable device around the neck of a user using a lanyard.

The apparatuses, units, modules, devices, and other components illustrated in FIG. 7 that perform the operations described herein with respect to FIGS. 1-6C are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-6C. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 6C that perform the operations described herein are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A three-dimensional (3D) rendering method comprising:
   determining respective color values of vertices shaded by a direct virtual light source;
   establishing a polygonal area bounded by the vertices;

determining, based on the vertices, an indirect virtual light source at a location within the polygonal area;
establishing, based on the respective color values of the vertices, the location; and
rendering a 3D scene based on the location of the indirect virtual light source,
wherein the determining the indirect virtual light source comprises:
determining a number of additional indirect virtual light sources for the polygonal area based on a size of the polygonal area from a viewpoint of a virtual camera and the respective color values of the vertices, and
wherein each color value of the vertices of the additional indirect virtual light sources is a function of the location of the indirect virtual light source, a location of a vertex, a normal of the vertex, a color value of the indirect virtual light source, and a color value of the vertex.

2. The 3D rendering method of claim 1, wherein the establishing of the location comprises:
determining respective brightness values of the vertices based on the respective color values of the vertices; and
establishing the location of the indirect virtual light source based on the respective brightness values of the vertices.

3. The 3D rendering method of claim 2, further comprising:
determining an average brightness of the polygonal area based on an average of the respective brightness values of the vertices;
setting a weight value based on the average brightness of the polygonal area; and
determining the number of additional indirect virtual light sources within the polygonal area based on the weighted value.

4. The 3D rendering method of claim 2, wherein the establishing of the location comprises:
determining, based on the respective brightness values of the vertices, respective probability values of a plurality of locations within the polygonal area; and
selecting the location of the indirect virtual light source from among the plurality of locations based on the respective probability values.

5. The 3D rendering method of claim 4, wherein the respective probability value of a first location of the plurality of locations adjacent to a first vertex of the vertices having a respective brightness value greater than the respective brightness value of a second vertex of the vertices is higher the respective probability of a second location of the plurality of locations adjacent to the second vertex.

6. The 3D rendering method of claim 1, further comprising establishing respective additional locations of the additional indirect virtual light sources by randomly designating the respective additional locations within the polygonal area.

7. The 3D rendering method of claim 6, wherein the establishing of the respective additional locations comprises:
determining respective brightness values of the vertices based on the respective color values of the vertices; and
determining a second location of a second indirect virtual light source from among the additional indirect virtual light sources within the polygonal area based on the respective brightness values of the vertices and the size of the polygonal area.

8. The 3D rendering method of claim 1, wherein the establishing of the location comprises:
determining respective candidate locations within the polygonal area for a plurality of candidate indirect virtual light sources based on the respective color values of the vertices; and
selecting the indirect virtual light source from among the plurality of candidate indirect virtual light sources based on the respective candidate locations and a location of the virtual camera.

9. The 3D rendering method of claim 8, wherein the selecting comprises:
determining a sampling level for a hierarchy of the plurality of candidate indirect virtual light sources based on a distance between the location of the virtual camera and an area on which shading is to be performed; and
selecting the indirect virtual light source from among the plurality of candidate indirect virtual light sources based on the determined sampling level.

10. The 3D rendering method of claim 9, wherein the hierarchy of the plurality of candidate indirect virtual light sources is based on a hierarchy of the vertices.

11. The 3D rendering method of claim 1, wherein the determining of the respective color values of the vertices comprises determining the respective color values of the vertices by adding the respective color values, determined through shading by the direct virtual light source, of the vertices.

12. The 3D rendering method of claim 1, wherein the determining of the color values of the vertices comprises determining the respective color values of the vertices based on respective vertex information of the vertices and attribute information of the direct virtual light source.

13. A non-transitory computer-readable storage medium storing instructions for causing computing hardware to perform the method of claim 1.

14. The 3D rendering method of claim 1, further comprising:
determining a plurality of candidate indirect virtual light sources within the polygonal area; and
clustering the plurality of candidate indirect virtual light sources into groups based on respective characteristics of the plurality of candidate indirect virtual light sources.

15. The 3D rendering method of claim 14, wherein the respective characteristics comprise either one or both of adjacent locations of the candidate indirect virtual light sources or color similarity of the indirect virtual light sources.

16. The 3D rendering method of claim 14, further comprising:
selecting, as the indirect virtual light source, a first candidate indirect virtual light source of a first group among the clustered groups; and
discarding remaining candidate indirect virtual light sources other than the first candidate indirect virtual light source of the first group.

17. A three-dimensional (3D) image rendering apparatus comprising:
at least one processor configured to determine respective color values of vertices shaded by a direct virtual light source;
establish a polygonal area bounded by the vertices;
determine, based on the vertices, an indirect virtual light source at a location within the polygonal area;
establish, based on the respective color values of the vertices, the location;

render a 3D scene based on the location of the indirect virtual light source; and determine a number of additional indirect virtual light sources for the polygonal area based on a size of the polygonal area from a viewpoint of a virtual camera and the respective color values of the vertices, wherein each color value of the vertices of the additional indirect virtual light sources is a function of the location of the indirect virtual light source, a location of a vertex, a normal of the vertex, a color value of the indirect virtual light source, and a color value of the vertex.

18. The 3D image rendering apparatus of claim 17, wherein the processor is further configured to:

determine respective brightness values of the vertices based on the respective color values of the vertices;

determine a number of additional indirect virtual light sources for the polygonal area based on a size of the polygonal area from a viewpoint of a virtual camera and the respective brightness values of the vertices; and establish respective additional locations of the additional indirect virtual light sources by randomly designating the respective additional locations within the polygonal area.

19. The 3D image rendering apparatus of claim 17, wherein the processor is further configured to:

determine respective candidate locations for a plurality of candidate indirect virtual light sources within the polygonal area based on the respective color values of the vertices; and select the indirect virtual light source from among the candidate indirect virtual light sources based on the respective candidate locations and a location of the virtual camera.

* * * * *